United States Patent
Nakahara et al.

(10) Patent No.: US 9,443,661 B2
(45) Date of Patent: Sep. 13, 2016

(54) POWER STORAGE DEVICE HAVING A NITROXYL POLYMER IN A CATHODE AND A LITHIUM OR LITHIUM ALLOY ANODE

(75) Inventors: Kentaro Nakahara, Tokyo (JP); Jiro Iriyama, Tokyo (JP); Shigeyuki Iwasa, Tokyo (JP); Masahiro Suguro, Tokyo (JP); Masaharu Satoh, Tokyo (JP)

(73) Assignee: NEC CORPORATION (JP)

( * ) Notice: Subject to any disclaimer, the term of this patent is extended or adjusted under 35 U.S.C. 154(b) by 1889 days.

(21) Appl. No.: 10/597,518

(22) PCT Filed: Dec. 17, 2004

(86) PCT No.: PCT/JP2004/018908
§ 371 (c)(1),
(2), (4) Date: Jul. 27, 2006

(87) PCT Pub. No.: WO2005/078831
PCT Pub. Date: Aug. 25, 2005

(65) Prior Publication Data
US 2008/0213669 A1  Sep. 4, 2008

(30) Foreign Application Priority Data

Feb. 16, 2004  (JP) .................................. 2004-038807

(51) Int. Cl.
| | |
|---|---|
| *H01M 4/04* | (2006.01) |
| *H01G 9/00* | (2006.01) |
| *H01M 4/60* | (2006.01) |
| *H01M 10/052* | (2010.01) |
| *H01M 4/137* | (2010.01) |
| *H01M 4/40* | (2006.01) |

(52) U.S. Cl.
CPC ............... *H01G 9/155* (2013.01); *H01M 4/60* (2013.01); *H01M 4/602* (2013.01); *H01M 10/052* (2013.01); *H01M 4/137* (2013.01); *H01M 4/405* (2013.01); *Y02E 60/122* (2013.01); *Y02E 60/13* (2013.01); *Y02T 10/7011* (2013.01); *Y02T 10/7022* (2013.01)

(58) Field of Classification Search
None
See application file for complete search history.

(56) References Cited

U.S. PATENT DOCUMENTS

| | | | | |
|---|---|---|---|---|
| 4,632,889 | A | * | 12/1986 | McManis et al. ............... 164/97 |
| 5,777,428 | A | * | 7/1998 | Farahmandi et al. ........ 313/352 |
| 6,090,506 | A | * | 7/2000 | Inoue et al. .................. 429/232 |
| 6,627,252 | B1 | * | 9/2003 | Nanjundiah et al. ........... 427/79 |

FOREIGN PATENT DOCUMENTS

| | | | |
|---|---|---|---|
| JP | 2002-117854 | 4/2002 | ............. H01M 4/60 |
| JP | 2002-117855 | 4/2002 | ............. H01M 4/60 |
| JP | 2002-070568 | 6/2002 | ............. H01M 4/60 |
| JP | 2002-304996 | 10/2002 | ............. H01M 4/60 |

(Continued)

OTHER PUBLICATIONS

Machine translation of JP 2002-304996, Nakahara et al., Oct. 18, 2002.*

*Primary Examiner* — Maria J Laios
(74) *Attorney, Agent, or Firm* — Hayes Soloway PC

(57) ABSTRACT

An object of the present invention is to provide a power storage device with excellent cycle property, employing a cathode containing a nitroxyl polymer. To attain the object in the present invention, in the power storage device employing a cathode comprising a nitroxyl polymer, a lithium or lithium alloy anode is used as an anode active material and the cathode is in direct contact with the anode.

12 Claims, 1 Drawing Sheet

(56) References Cited

FOREIGN PATENT DOCUMENTS

| JP | 2003-022809 | 1/2003 | ............ H01M 4/60 |
| JP | 2003-036849 | 2/2003 | ............ H01M 4/60 |
| JP | 2003-123759 | 4/2003 | ............ H01M 4/60 |
| JP | 2003-132891 | 5/2003 | ............ H01M 4/60 |
| JP | 2003-242980 | 8/2003 | ............ H01M 4/60 |

\* cited by examiner

POWER STORAGE DEVICE HAVING A NITROXYL POLYMER IN A CATHODE AND A LITHIUM OR LITHIUM ALLOY ANODE

FIELD OF THE INVENTION

The present invention relates to a power storage device with excellent cycle property.

DESCRIPTION OF THE RELATED ART

A power storage device using a nitroxyl polymer as a cathode active material has been proposed. For example, in the conventional power storage device described in FIG. 1 of Patent Document 1, the power storage device is constructed by facing a cathode containing a nitroxyl polymer as an active material with an anode through a separator sandwiched therebetween.

Patent Document 1: Japanese Patent Application Laid-Open No. 2002-304996.

SUMMARY OF THE INVENTION

A power storage device using a lithium or lithium alloy anode as the anode of the power storage device disclosed in Patent Document 1 has a problem that the capacity of the device greatly decreases by repeating a charge-discharge cycle. The cause of the problem is that lithium precipitates in the form of dendrite on the surface of the lithium or lithium alloy anode when the power storage device is charged, producing dead lithium that can not contribute to discharge. An object of the present invention is to provide a power storage device with excellent cycle property, using a lithium or lithium alloy anode as an anode active material and a nitroxyl polymer as a cathode active material.

MEANS FOR SOLVING THE PROBLEM

<Feature of the Invention>

The present invention provides a power storage device comprising a nitroxyl polymer which has a nitroxyl cation partial structure represented by the following chemical formula (I) in oxidation state and has a nitroxyl radical partial structure represented by the following chemical formula (II) in reduction state, in a cathode; employing a reaction for transferring an electron between the two states represented by the following equation (B) as an electrode reaction of the cathode; and using a lithium or lithium alloy anode as an anode active material; wherein the cathode is in direct contact with the anode.

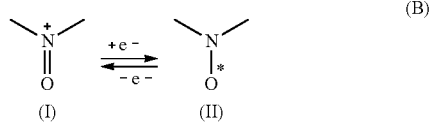

(B)

<Function>

The nitroxyl polymer in contact with a lithium or lithium alloy anode exhibits a catalytic effect on the surface of the lithium or lithium alloy anode, thereby suppressing dendrite growth on the anode surface and improving the cycle property of the power storage device.

EFFECTS OF THE INVENTION

According to the present invention, it is possible to provide a power storage device with excellent cycle property by a nitroxyl polymer being in direct contact with a lithium or lithium alloy anode.

DESCRIPTION OF SYMBOLS

Figure 1:
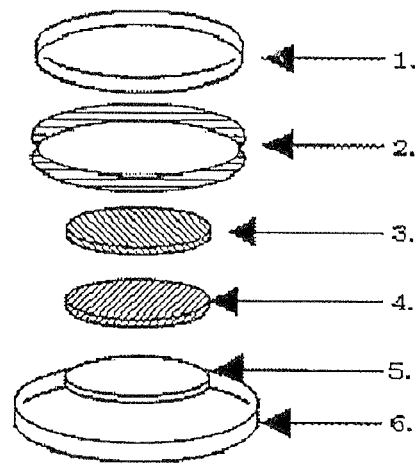
FIG. 1 is a schematic view showing the structure of a power storage device set forth in a first embodiment.

1. Anode metal collector
2. Insulating packing
3. Lithium or lithium alloy anode
4. Cathode containing a nitroxyl polymer
5. Cathode collector
6. Cathode metal collector

DETAILED DESCRIPTION OF THE INVENTION

<Structure>

Next, the embodiments of the present invention will be more specifically explained with reference to the drawings.

FIG. 1 shows a schematic view of a power storage device according to a first embodiment of the present invention.

A power storage device according to the present invention, for example, has the structure shown in FIG. 1. The power storage device shown in FIG. 1 is characterized in that an anode 3 consisting of lithium or a lithium alloy is in direct contact with a cathode 4 containing a nitroxyl polymer used as a cathode active material. The power storage device of the first embodiment has a coin-type shape. In the first embodiment, poly (2,2,6,6-tetramethylpiperidinoxy methacrylate) (PTMA) represented by chemical formula (1) is used as the nitroxyl polymer used as the cathode active material. As the cathode 4 containing the nitroxyl polymer according to the first embodiment, a PTMA electrode containing an electrolyte is used. As the electrolyte according to the first embodiment, a mixture solvent of ethylene carbonate (EC) and diethyl carbonate (DEC) (the volume ratio of ED/DEC is 3/7) containing 1 M $LiPF_6$ as a supporting salt is used. As a cathode collector 5 according to the first embodiment, an electrode having a conductive auxiliary layer containing carbon as a main component formed and integrated on an aluminum plate is used. As an anode metal collector 1 and a cathode metal collector 6 according to the first embodiment, a metal collector made of a stainless steel plate is used. As an insulating packing 2 according to the first embodiment, a polypropylene insulating packing is used.

(1)

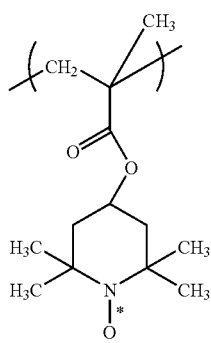

<Manufacturing Method>

Next, referring to FIG. 1, a method for manufacturing a power storage device according to the first embodiment will be explained.

In a 100 ml eggplant flask equipped with a reflux tube, 20 g (0.089 mol) of a 2,2,6,6-tetramethylpiperidine methacrylate monomer was placed and dissolved in 80 ml of dry tetrahydrofuran. To the solution, 0.29 g (0.00178 mol) of azobisisobutyronitrile (AIBN) (monomer/AIBN=50/1) was added and the resultant mixture was stirred under argon atmosphere at 75 to 80° C. After the reaction was performed for 6 hours, it was cooled to room temperature. The polymer was precipitated in hexane, separated by filtration, and dried under vacuum to obtain 18 g of poly(2,2,6,6-tetramethylpiperidine methacrylate) in a yield of 90%. Subsequently, 10 g of poly(2,2,6,6-tetramethylpiperidine methacrylate) thus obtained was dissolved in 100 ml of dry dichloromethane. To the solution, 100 ml of a dichloromethane solution of 15.2 g (0.088 mol) of m-chloroperbenzoic acid was dropped at room temperature while stirring for one hour. After further stirring for 6 hours, precipitated m-chlorobenzoic acid was filtered off and the filtrate was washed with an aqueous solution of sodium carbonate and water, and then dichloromethane was distilled away. The remaining solid was pulverized and the obtained powder was washed with diethylcarbonate (DEC), and then, dried under vacuum to obtain 7.2 g of poly(2,2,6,6-tetramethylpiperidinoxy methacrylate) (PTMA) represented by chemical formula (2) in a yield of 68.2% as brown powder. The structure of the polymer thus obtained was confirmed by IR. As a result of GPC measurement, the weight average molecular weight (Mw) was 89,000 and dispersion Mw/Mn was 3.30. The spin density obtained from an ESR spectrum was $2.26 \times 10^{21}$ spin/g. This value coincides with the spin density on the assumption that 90% of the N—H groups of poly(2,2,6,6-tetramethylpiperidine methacrylate) are converted into N—O radicals.

(2)

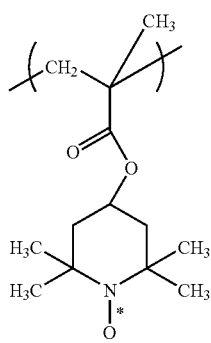

20 g of pure water was weighed and placed in a small homogenizer container. To the container, a binder (272 mg) consisting of Teflon (registered trade mark) particles and cellulose was added and completely dissolved by stirring for 3 minutes. To the mixture, 2.0 g of acetylene black was added and stirred for 15 minutes to obtain a slurry. The obtained slurry was thinly applied onto an aluminum plate with the thickness of 20 micron, and dried at 100° C. to form a conductive auxiliary layer. The thickness of the conductive auxiliary layer was 10 microns. In this way, a cathode collector was obtained having the conductive auxiliary layer containing carbon as a main component formed and integrated with the aluminum plate.

Next, 20 g of N-methyl pyrrolidone was weighed and placed in a small homogenizer container. To the container, 1.0 g of synthetic polymethacrylate represented by chemical formula (2) was added and completely dissolved by stirring for 5 minutes. The obtained solution was thinly applied onto the cathode collector having the conductive auxiliary layer containing carbon as a main component formed and integrated on the aluminum plate and dried at 125° C. to form a cathode.

The obtained electrode plate was dried at 80° C. under vacuum overnight and punched to form a disk shape with a diameter of 12 mm to form a electrode for a power storage device. Next, the electrode thus obtained was dipped into an electrolyte and the cathode containing the nitroxyl polymer was impregnated with the electrolyte and mounted on a cathode metal collector. As the electrolyte, an EC/DEC mixture solution containing 1 mol/L of an $LiPF_6$ electrolytic salt was used. Next, on the nitroxyl polymer electrode containing the electrolyte, a lithium metal plate as an anode was directly laminated and an anode metal collector coated with insulating packing was put on. The laminate formed in this manner was pressed by a caulker to obtain a coin-type power storage device.

<Other Embodiments of the Present Invention>

A power storage device, which is formed in a coin-type in the first embodiment, can be manufactured in a conventionally known shape. Examples of a power storage device shape include one where a laminate or a winding of electrode is encapsulated with a metal case, a resin case, a laminate film or the like. Examples of the outside shape include a cylinder type, a square type, a coin type and a sheet type.

The cathode collector, in which a conductive auxiliary layer containing carbon as a main component is formed and integrated on an aluminum electrode in the first embodiment, may be replaced with a conventionally known cathode collector. Examples of the conventionally known cathode collector include a carbon paper and a graphite electrode. When a carbon paper is used as the cathode collector, the contact area between a cathode containing a nitroxyl polymer and the cathode collector can be enlarged, to desirably improve output property. The carbon paper used in the present invention, which is a general term representing a material formed by integrating a fibrous carbon and spreading it to be flat, is roughly classified into a group having non-woven structure and a group having a fabric structure. The thickness of the carbon paper is about 0.03 to 0.50 millimeter, and preferably 0.05 millimeter or more in order to maintain mechanical strength. However, in view of increasing the energy density of the power storage device, the thickness of the carbon paper is desirably thinner, preferably 0.25 millimeter or less. The void ratio of the carbon paper is generally about 50 to 90%, and preferably 70% or more in view of increasing the contact area with the cathode. The electric resistance of the carbon paper at room temperature is 300 mΩ/cm or less in the thickness direction and 30 mΩ/cm or less in the in-plane direction in view of reducing the internal resistance of the power storage device.

A conductive auxiliary layer, which is formed by a coating method in the first embodiment, may be formed by a deposition method. When a conductive auxiliary layer containing a carbonaceous material as a main component is formed by a deposition method, the conductive auxiliary layer can be obtained as a thin coating film on the aluminum electrode. As a result, the resultant power storage device has a synergistic effect to improve energy density. The conductive auxiliary layer of the present invention serves as a layer for helping electrical-charge transfer between the nitroxyl polymer as the cathode active material and aluminum, and contains a carbonaceous material as a main component. The main component used herein refers to a component whose content exceeds 50% by weight based on the total weight of the layer. Examples of the carbonaceous material include activated carbon, graphite, carbon black, furnace black, amorphous carbon and the like.

Furthermore, the present invention may be constituted without the cathode collector mentioned above.

PTMA, which serves as a cathode active material in the first embodiment, may be constituted of a conventionally known nitroxyl polymer. The nitroxyl polymer of the present invention is a general term representing polymer compounds having a nitroxyl structure typically represented by chemical formula (3). The nitroxyl structure may take the states of chemical formula (I) to (III) shown in the Reaction equation (A), in accordance with electron transfer.

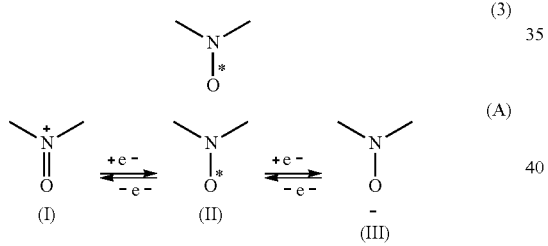

In the power storage device according to the present invention, the reaction between chemical formula (I) and chemical formula (II) is used as the electrode reaction of a cathode to activate storage operation by storing and releasing electrons thereby. The power storage device has at least a cathode and an anode and can take out energy electrochemically stored in the form of electric power. The cathode of the power storage device refers to an electrode having a higher oxidation reduction potential, whereas the anode refers to an electrode having a lower oxidation reduction potential.

In the present invention, as a nitroxyl structure taken in oxidation state, a cyclic nitroxyl structure represented by chemical formula (5) is preferable. In reduction state, the nitroxyl moiety of chemical formula (5) takes the nitroxyl radical structure represented by chemical formula (II). Each of $R_1$ to $R_4$ independently represents an alkyl group, and particularly preferably, a straight alkyl group. In view of radical stability, an alkyl group having 1 to 4 carbon atoms is preferable and particularly preferably, a methyl group. In the group X, an atom constituting a member of a ring is selected from the group consisting of carbon, oxygen, nitrogen and sulfur. The group X represents a divalent group which forms a 5- to 7-membered ring in the chemical formula (5). Specific examples of the group X include —$CH_2CH_2$—, —$CH_2CH_2CH_2$—, —$CH_2CH_2CH_2CH_2$—, —CH=CH—, —CH=CHCH$_2$—, —CH=CHCH$_2$CH$_2$—, and —CH$_2$CH=CHCH$_2$—. The unadjacent —CH$_2$— in them may be replaced with —O—, —NH— or —S— and the —CH= may be replaced with —N=. Furthermore, a hydrogen atom bound to an atom constituting a ring may be replaced with an alkyl group, halogen atom, =O or the like.

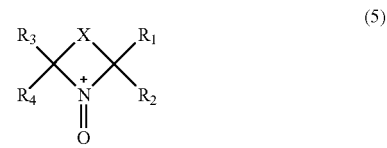

A particularly preferable cyclic nitroxyl structure in oxidation state is selected from the group consisted of a 2,2,6,6-tetramethylpiperidinoxyl cation represented by chemical formula (6), a 2,2,5,5-tetramethylpyrrolidinoxyl cation represented by chemical formula (7) and 2,2,5,5-tetramethylpyrrolinoxyl cation represented by chemical formula (8).

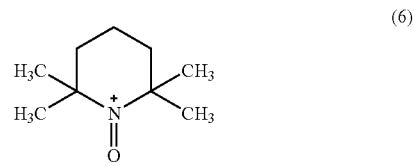

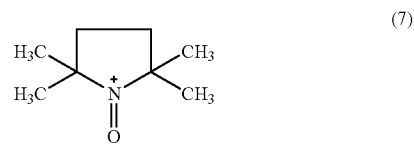

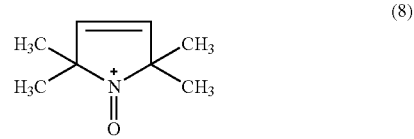

In the present invention, the cyclic nitroxyl structure represented by chemical formula (5) mentioned above constitutes a part of side chain or main chain of a polymer. More specifically, the cyclic nitroxyl group constitutes a part of side chain or main chain of a polymer by removing at least one hydrogen atom bonded to an element forming a cyclic structure. The cyclic nitroxyl group is preferably present in a side chain in view of easiness of synthesis and the like. When the cyclic nitroxyl group is present in a side chain, it is bonded to the main chain polymer via a residue X', obtained by removing a hydrogen atom from —CH$_2$—, —CH=, or —NH— which is a member of a group X constituting a ring in chemical formula (5), as shown in chemical formula (9):

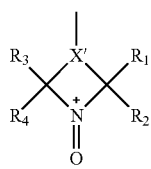

(9)

wherein $R_1$ to $R_4$ are the same as defined in chemical formula (5).

The main-chain polymer used herein is not particularly limited. Any polymer may be used as long as the residue having a cyclic nitroxyl structure represented by chemical formula (9) is present in a side chain. More specifically, examples include those where a residue represented by chemical formula (9) is added to a following polymer or a part of atoms or groups is replaced by the residue represented by chemical formula (9). In either case, the residue represented by chemical formula (9) may be bonded not directly but via an appropriate divalent group. Examples include: polyalkylene polymers such as polyethylene, polypropylene, polybutene, polydecene, polydodecene, polyheptene, polyisobutene, and polyoctadecene; diene polymers such as polybutadiene, polychloroprene, polyisoprene, and poly isobutene; poly(meth)acrylic acid; poly(meth)acrylonitrile; poly(meth)acrylamide polymers such as poly(meth)acrylamide, polymethyl (meth)acrylamide, poly dimethyl (meth)acrylamide, and polyisopropyl (meth)acrylamide; polyalkyl (meth)acrylates such as polymethyl (meth)acrylate, polyethyl (meth)acrylate, and polybutyl (meth)acrylate; fluorine polymers such as polyvinylidene fluoride, and polytetrafluoroethylene; polystyrene polymers such as polystyrene, polybromostyrene, polychlorostyrene, and polymethyl styrene; vinyl polymers such as polyvinyl acetate, polyvinyl alcohol, polyvinylchloride, polyvinylmethyl ether, polyvinylcarbazole, polyvinyl pyridine, and polyvinylpyrrolidone; polyether polymers such as polyethylene oxide, polypropylene oxide, polybutene oxide, polyoxymethylene, polyacetaldehyde, polymethylvinyl ether, polypropylvinyl ether, polybutylvinyl ether, and polybenzylvinyl ether; polysulfide polymers such as polymethylene sulfide, polyethylene sulfide, polyethylene disulfide, polypropylene sulfide, polyphenylene sulfide, polyethylene tetrasulfide, and polyethylene trimethylene sulfide; polyesters such as polyethylene terephthalate, polyethylene adipate, polyethylene isophthalate, polyethylene naphthalate, polyethylene paraphenylene diacetate, and polyethylene isopropylidene dibenzoate; polyurethanes such as polytrimethylene ethylene urethane; polyketone polymers such as polyetherketone and polyallyl etherketone; polyanhydride polymers such as polyoxy isophthaloyl; polyamine polymers such as polyethylene amine, polyhexamethylene amine, and polyethylene trimethylene amine; polyamide polymers such as nylon, polyglycine, and polyalanine; polyimine polymers such as polyacetyl iminoethylene and poly benzoyl iminoethylene; polyimide polymers such as polyesterimide, polyetherimide, polybenzimide, and polypyromelimide; polyaromatic polymers such as polyallylene, polyallylene alkylene, polyallylene alkenylene, polyphenol, phenolic resin, cellulose, polybenzimidazole, polybenzothiazole, polybenzoxazine, polybenzoxazole, polycarborane, polydibenzofuran, polyoxo isoindoline, polyfuran tetracarboxylic diimide, polyoxadiazole, polyoxindole, polyphthalazine, polyphthalide, polycyanurate, polyisocyanurate, polypiperazine, polypiperidine, polypyrazinoquinoxan, polypyrazole, polypyridazine, polypyridine, polypyrromerithymine, polyquinone, polypyrrolidine, polyquinoxaline, polytriazine, and polytriazole; siloxane polymers such as polydisiloxane, polydimethyl siloxane; polysilane polymers; polysilazane polymers; polyphosphazene polymers; polythiazyl polymers; and conjugated polymers such as polyacetylene, polypyrrol, and polyaniline. (Meth)acryl means methacryl or acryl.

Among them, polyalkylene polymers, poly(meth)acrylic acids, poly(meth)acrylamide polymers, polyalkyl(meth)acrylates, polystyrene polymers are preferable since a main chain has excellent electrochemical tolerance. The main chain refers to a carbon chain containing the largest carbon numbers in a polymer compound. Among these polymers, a polymer which can contain a unit represented by the following chemical formula (10) in oxidization state is preferably selected.

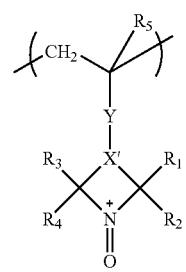

(10)

In the formula, $R_1$ to $R_4$ are the same as defined in chemical formula (5). $R_5$ represents a hydrogen or a methyl group. Y is not particularly limited; but may be —CO—, —COO—, —CONR$_6$—, —O—, —S—, an alkylene group having 1 to 18 carbon atoms that may have a substituent, an arylene group having 1 to 18 carbon atoms that may have a substituent, and a divalent group having these groups in combination of two or more. $R_6$ represents an alkyl group having 1 to 18 carbon atoms. Among the units represented by chemical formula (10), those represented by the following chemical formulas (11) to (14) are particularly preferable.

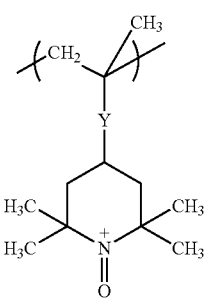

(11)

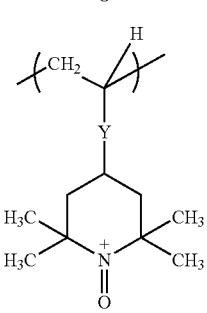

(12)

-continued

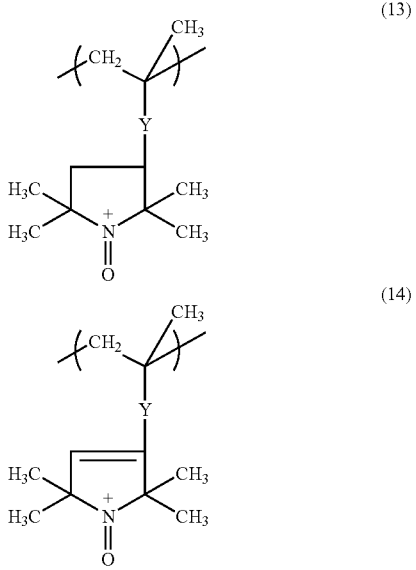

In chemical formulas (11) to (14), Y is the same as defined in chemical formula (10); however, either —COO— or CONR$_6$— is particularly preferable.

In the present invention, the residue of chemical formula (9) is not necessarily present in all of the side chains. For example, all of the units constituting a polymer may be represented by chemical formula (10) and a part of the units may be represented by chemical formula (10). The content of the residue in the polymer differs depending upon the purpose, structure and a production method, as long as it is present even in a small amount, generally 1% by weight or more, and particularly preferably 10% by weight or more. Synthesis of a polymer is not particularly limited. When desiring as much power storage operation as possible, 50% by weight or more, particularly 80% by weight or more is preferable.

Such a polymer can be is synthesized by, for example, polymerizing a monomer represented by the following chemical formula (15) by itself or by copolymerizing the monomer with a copolymerizable monomer such as alkyl acrylate, followed by oxidizing a —NH— moiety. In this manner, a polymer having a unit represented by chemical formula (10) can be obtained in oxidation state.

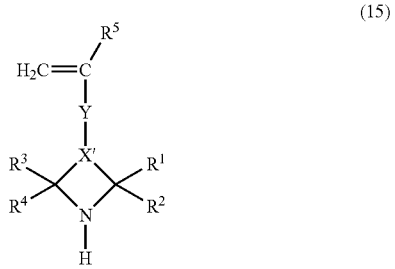

Alternatively, after a base polymer is synthesized by polymerization of methacrylic acid and the like, a residue represented by chemical formula (9) (or a residue having a —NH— before it is oxidized by a NO radical) may be introduced by a polymerization reaction.

The molecular weight of a nitroxyl polymer in the present invention is not particularly limited; but is preferably too large to be dissolved in an electrolyte. Such molecular weight differs depending upon the type of organic solvent in the electrolyte. The weight average molecular weight is generally 1,000 or more, preferably 10,000 or more, and particularly 100,000 or more. Since a nitroxyl polymer may be added in the form of powder to a cathode in the present invention, any molecular weight may be acceptable no matter how it is large. The weight average molecular weight is generally 5,000,000 or less. The polymer containing a residue represented by chemical formula (9) may be cross-linked, so that the durability of an electrolyte can be improved thereby.

To the cathode of the present invention, a conventionally known polymer electrolyte may be added in order to increase ion conductivity. Examples of the conventionally known polymer electrolyte include vinylidene fluoride polymers such as polyvinylidene fluoride and vinylidene fluoride-hexafluoropropylene copolymer; acrylonitrile polymers such as acrylonitrile-methyl methacrylate copolymer, and acrylonitrile-methyl acrylate copolymer; and polyethylene oxide. Furthermore, since the cathode is in direct contact with the anode in the present invention, it is not preferable that a conventionally known electro-conductivity imparting agent such as acetylene black is contained in a large amount in the cathode. The content of the electro-conductivity imparting agent in the cathode is preferably 50% by weight or less, more preferably 40% by weight or less, and most preferably substantially zero. The cathode may contain a conventionally known binder, if necessary.

A power storage device can be formed by replacing an anode, which is formed of a lithium metal in the first embodiment, with a conventionally known lithium alloy anode. Examples of the conventionally known lithium alloy anode include a lithium-aluminum alloy lithium-tin alloy and lithium-silicon alloy.

A power storage device can be formed by replacing the material of the anode metal collector, which is formed of stainless steel in the first embodiment, with a conventionally known material. Examples of the conventionally known material for the anode metal collector include nickel, aluminum, copper, gold, silver, titanium, and an aluminum alloy. They may be in the form of foil, flat surface, and mesh.

A power storage device can be formed by replacing the material of the cathode metal collector, which is formed of stainless steel in the first embodiment, with a conventionally known material. Examples of the conventionally known material for the cathode metal collector include nickel, aluminum, copper, gold, silver, titanium, and an aluminum alloy. They may be in the form of foil, flat surface, and mesh. Furthermore, if an electrode having a conductive auxiliary layer containing carbon as a main component formed and integrated on an aluminum electrode is used as the cathode collector, the cathode metal collector may not be used and aluminum used as a cathode collector may be used in place of the cathode metal collector.

A power storage device can be formed by replacing the electrolyte using an EC/DEC mixture solution containing an electrolyte salt, LiPF$_6$ (1 mol/L) in the first embodiment, with a conventionally known electrolyte. The electrolyte has a function of transporting charge carriers between the anode 3 and the cathode 4 and generally has an electrolyte ion conductivity of $10^{-5}$ to $10^{-1}$ S/cm at room temperature. As the conventionally known electrolyte, an electrolyte having an electrolyte salt dissolved in a solvent may be used. Examples of the solvent include organic solvents such as ethylene carbonate, propylene carbonate, dimethyl carbonate, diethyl carbonate, methyl ethyl carbonate, γ-butyrolactone, tetrahydrofuran, dioxolane, sulfolane, dimethyl formamide, dimethyl acetamide, and N-methyl-2-pyrrolidone; an aqueous solution of sulfuric acid, and water. These solvents may be used alone or in a mixture of two or more types in the present invention. Examples of the electrolyte salt include $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_2)_3$, and $LiC(C_2F_5SO_2)_3$.

A conventionally known separator is not used in the present invention since the cathode is in direct contact with the anode.

EXAMPLES

A method of manufacturing a device according to an embodiment will be described by way of examples.

<Synthesis of a Polymer having a Cyclic Nitroxyl Structure>

In a 100 ml eggplant flask equipped with a reflux tube, 20 g (0.089 mol) of a 2,2,6,6-tetramethylpiperidine methacrylate monomer was placed and dissolved in 80 ml of dry tetrahydrofuran. To the solution, 0.29 g (0.00178 mol) of azobisisobutyronitrile (AIBN) (monomer/AIBN=50/1) was added and the resultant mixture was stirred under argon atmosphere at 75 to 80° C. After the reaction was performed for 6 hours, it was cooled to room temperature. The polymer was precipitated in hexane, separated by filtration, and dried under vacuum to obtain 18 g of poly(2,2,6,6-tetramethylpiperidine methacrylate) in a yield of 90%. Subsequently, 10 g of poly(2,2,6,6-tetramethylpiperidine methacrylate) thus obtained was dissolved in 100 ml of dry dichloromethane. To the solution, 100 ml of a dichloromethane solution of 15.2 g (0.088 mol) of m-chloroperbenzoic acid was dropped at room temperature while stirring for one hour. After further stirring for 6 hours, precipitated m-chlorobenzoic acid was filtered off and the filtrate was washed with an aqueous solution of sodium carbonate and water, and then dichloromethane was distilled away. The remaining solid was pulverized and the obtained powder was washed with diethylcarbonate (DEC), and then, dried under vacuum to obtain 7.2 g of poly(2,2,6,6-tetramethylpiperidinoxy methacrylate) (PTMA) represented by chemical formula (16) in a yield of 68.2% as brown powder. The structure of the polymer thus obtained was confirmed by IR. As a result of GPC measurement, the weight average molecular weight (Mw) was 89,000 and dispersion Mw/Mn was 3.30. The spin density obtained from an ESR spectrum was $2.26 \times 10^{21}$ spin/g. This value coincides with the spin density on the assumption that 90% of the N-H groups of poly(2,2,6,6-tetramethylpiperidine methacrylate) are converted into N—O radicals.

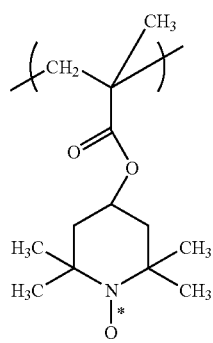

(16)

In the same manner, poly(2,2,6,6-tetrametylpiperidinoxy acrylate) represented by chemical formula (17) (weight average molecular weight Mw =74,000, dispersion Mw/Mn=2.45, the spin density: $2.23 \times 10^{21}$ spin/g which coincides with the spin density on the assumption that 84% of the N—H groups is converted to N—O radicals); poly (2,2,5,5 tetramethylpyrrolidinoxy methacrylate) represented by chemical formula (18) (weight average molecular weight Mw=52,000, dispersion Mw/Mn=3.57, the spin density: $1.96 \times 10^{21}$ spin/g which coincides with the spin density on the assumption that 74% of the N—H groups is converted to N—O radicals); and poly(2,2,5,5-tetramethylpyrrolinoxy methacrylate) represented by chemical formula (19) (weight average molecular weight Mw=33,000, dispersion Mw/Mn=4.01, the spin density: $2.09 \times 10^{21}$ spin/g which coincides with the spin density on the assumption that 78% of the N—H groups is converted to N—O radicals) were synthesized.

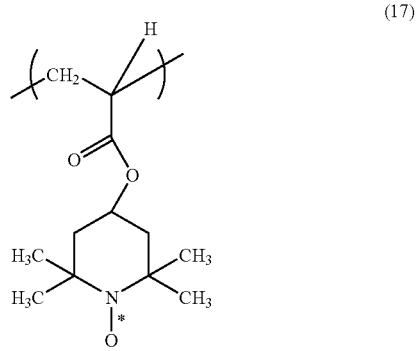

(17)

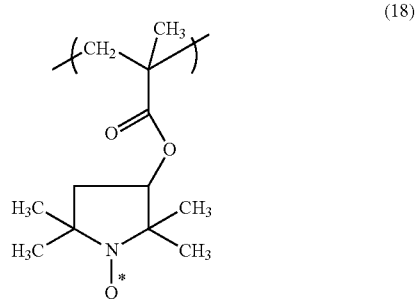

(18)

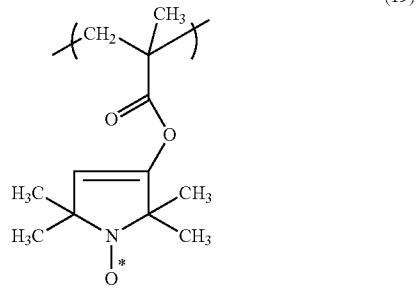

(19)

Example 1

20 g of pure water was weighed and placed in a small homogenizer container. To the container, 272 mg of the binder consisting of Teflon (registered trade mark) particles and cellulose was added and completely dissolved by stirring for 3 minutes. To the mixture, 2.0 g of acetylene black was added and stirred for 15 minutes to obtain a slurry. The obtained slurry was thinly applied onto an aluminum plate with the thickness of 20 micron, and dried at 100° C. to form a conductive auxiliary layer. The thickness of the conductive auxiliary layer was 10 microns. In this way, a cathode collector was obtained having the conductive auxiliary layer containing carbon as a main component formed and integrated with the aluminum plate.

Next, 20 g of N-methyl pyrrolidone was weighed and placed in a small homogenizer container. To the container, 1.0 g of synthetic polymethacrylate represented by chemical formula (16) was added and completely dissolved by stirring for 5 minutes. The obtained solution was thinly applied onto the cathode collector having the conductive auxiliary layer containing carbon as a main component formed and integrated on the aluminum plate and dried at 125° C. to form a cathode. The thickness of the cathode was 50 microns.

The obtained electrode plate was dried at 80° C. under vacuum overnight and punched to form a disk shape with a diameter of 12 mm to form a electrode for a power storage device. Next, the electrode thus obtained was dipped into an electrolyte and the cathode containing the nitroxyl polymer was impregnated with the electrolyte and mounted on a cathode metal collector (stainless steel plate). As the electrolyte, an EC/DEC mixture solution (the volume ratio of EC/DEC is 3/7) containing 1 mol/L of an $LiPF_6$ electrolytic salt was used. Next, on the nitroxyl polymer electrode containing the electrolyte, a lithium metal plate as an anode was directly laminated and an anode metal collector (stainless steel plate) coated with insulating packing (made of polypropylene) was put on. The laminate formed in this manner was pressed by a caulker to obtain a coin-type power storage device.

Example 2

20 g of N-methyl pyrrolidone was weighed and placed in a small homogenizer container. To the container, 1.0 g of synthetic polyacrylate represented by chemical formula (17) was added and completely dissolved by stirring for 5 minutes. Thereafter, the same procedure as in Example 1 was conducted to obtain a coin-type power storage device.

Example 3

20 g of N-methyl pyrrolidone was weighed and placed in a small homogenizer container. To the container, 1.0 g of synthetic polymethacrylate represented by chemical formula (18) was added and completely dissolved by stirring for 5 minutes. Thereafter, the same procedure as in Example 1 was conducted to obtain a coin-type power storage device.

Example 4

20 g of N-methyl pyrrolidone was weighed and placed in a small homogenizer container. To the container, 1.0 g of synthetic polymethacrylate represented by chemical formula (19) was added and completely dissolved by stirring for 5 minutes. Thereafter, the same procedure as in Example 1 was conducted to obtain a coin-type power storage device.

Example 5

The same procedure as in Example 1 was conducted except that a lithium-tin alloy was used as the anode, to obtain a coin-type power storage device.

Example 6

The same procedure as in Example 1 was conducted except that a lithium-silicon alloy was used as the anode, to obtain a coin-type power storage device.

Example 7

20 g of N-methyl pyrrolidone was weighed and placed in a small homogenizer container. To the container, 1.0 g of synthetic polymethacrylate represented by chemical formula (16) was added and completely dissolved by stirring for 5 minutes. The solution thus obtained was thinly applied onto a carbon paper with the thickness of 110 microns (void ratio: 80%, electric resistance at room temperature: 80 $m\Omega/cm$ (in the thickness direction), 6.3 $m\Omega/cm$ (in the in-plane direction)) and dried at 125° C. to obtain an electrode. The thickness of the electrode was 50 microns. Thereafter, the same procedure as in Example 1 was conducted to obtain a coin-type power storage device.

Comparative Example 1

20 g of N-methyl pyrrolidone was weighed and placed in a small homogenizer container. To the container, 1.0 g of synthetic polymethacrylate represented by chemical formula (16) was added and completely dissolved by stirring for 5 minutes. The obtained solution was thinly applied onto the cathode collector having the conductive auxiliary layer containing carbon as a main component formed and integrated on the aluminum plate and dried at 125° C. to form a cathode. The thickness of the cathode was 50 microns.

The obtained electrode plate was dried at 80° C. under vacuum overnight and punched to form a disk shape with a diameter of 12 mm to form a electrode for a power storage device. Next, the electrode thus obtained was dipped into an electrolyte and the cathode containing the nitroxyl polymer was impregnated with the electrolyte and mounted on a cathode metal collector (stainless steel plate). As the electrolyte, an EC/DEC mixture solution (the volume ratio of EC/DEC is 3/7) containing 1 mol/L of an $LiPF_6$ electrolytic salt was used. Next, on the nitroxyl polymer electrode containing the electrolyte, a porous film separator (made of polypropylene) impregnated with the electrolyte in the same manner was put on and a lithium metal plate as an anode was laminated through the separator and an anode metal collector (stainless steel plate) coated with insulating packing (made of polypropylene) was put on. The laminate formed in this manner was pressed by a caulker to obtain a coin-type power storage device.

Comparative Example 2

20 g of N-methyl pyrrolidone was weighed and placed in a small homogenizer container. To the container, 1.0 g of synthetic polyacrylate represented by chemical formula (17) was added and completely dissolved by stirring for 5 minutes. Thereafter, the same procedure as in Comparative Example 1 was conducted to obtain a coin-type power storage device.

Comparative Example 3

20 g of N-methyl pyrrolidone was weighed and placed in a small homogenizer container. To the container, 1.0 g of synthetic polymethacrylate represented by chemical formula (18) was added and completely dissolved by stirring for 5 minutes. Thereafter, the same procedure as in Comparative Example 1 was conducted to obtain a coin-type power storage device.

Comparative Example 4

20 g of N-methyl pyrrolidone was weighed and placed in a small homogenizer container. To the container, 1.0 g of synthetic polymethacrylate represented by chemical formula (19) was added and completely dissolved by stirring for 5 minutes. Thereafter, the same procedure as in Comparative Example 1 was conducted to obtain a coin-type power storage device.

Comparative Example 5

The same procedure as in Comparative Example 1 was conducted except that a lithium-tin alloy was used as the anode, to obtain a coin-type power storage device.

Comparative Example 6

The same procedure as in Comparative Example 1 was conducted except that a lithium-silicon alloy was used as the anode, to obtain a coin-type power storage device.

Comparative Example 7

20 g of N-methyl pyrrolidone was weighed and placed in a small homogenizer container. To the container, 1.0 g of synthetic polymethacrylate represented by chemical formula (16) was added and completely dissolved by stirring for 5 minutes. The solution thus obtained was thinly applied onto a carbon paper with the thickness of 110 microns (void ratio: 80%, electric resistance at room temperature: 80 mΩ/cm (in the thickness direction), 6.3 mΩ/cm (in the in-plane direction)) and dried at 125° C. to obtain an electrode. The thickness of the electrode was 50 microns. Thereafter, the same procedure as in Comparative Example 1 was conducted to obtain a coin-type power storage device.

The open potential of the power storage device manufactured in Example 1 was 2.9 V. The power storage device thus obtained was charged with a constant current of 0.113 mA and the charge operation was terminated when the voltage increased to 4.0 V. When the power storage device charged was taken apart and the cathode was analyzed, a reduction of radical concentration was observed and production of corresponding a 2,2,6,6-tetramethylpiperidinoxyl cation was confirmed. The cation was stabilized with anion $PF_6^-$ of the electrolyte.

A power storage device was manufactured in the same manner and charged with a constant current of 0.113 mA. Immediately after the voltage increased to 4.0 V, discharge was performed. The discharge was performed at a constant current of 0.113 mA which is the same as in the charge operation and the discharge operation was terminated when the voltage decreased to 2.5 V. During the discharge operation, a flat portion was observed at about 3.4 V in the voltage profile. The flat voltage portion was found to correspond to the potential difference between the reduction reaction taking place at the cathode in which a nitroxyl cation changes to a nitroxyl radical and the ionization reaction of a lithium metal taking place at the anode. More specifically, this result evidently shows that the power storage device of Example 1 serves as a chemical battery. An average discharge voltage in Example 1 was 3.32 V.

Figure 2:
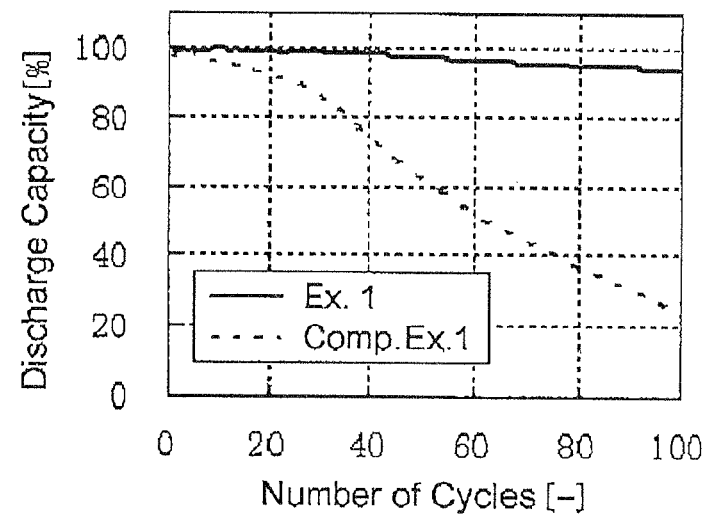
FIG. 2 is a graph showing cycle properties of the power storage devices manufactured in Example 1 and Comparative Example 1.

FIG. 2 shows cycle properties of the power storage devices manufactured in Example 1 and Comparative Example 1. In FIG. 2, capacity is expressed based on the initial discharge capacity as being 100%. It was found that a power storage device in which a nitroxyl polymer is in direct contact with the surface of a lithium anode such as in Example 1 has a more excellent cycle property than that in which they are laminated through a separator such as in Comparative Example 1. Cycle properties were evaluated in the same manner with respect to Examples 2 to 7 and Comparative Examples 2 to 7 and their capacity maintaining ratios after 100 cycles are summarized in Table 1.

TABLE 1

| | Capacity maintaining ratio after 100 cycles (%) | | Capacity maintaining ratio after 100 cycles (%) |
|---|---|---|---|
| Ex. 1 | 93 | Comp. Ex. 1 | 24 |
| Ex. 2 | 88 | Comp. Ex. 2 | 20 |
| Ex. 3 | 81 | Comp. Ex. 3 | 11 |
| Ex. 4 | 85 | Comp. Ex. 4 | 1 |
| Ex. 5 | 60 | Comp. Ex. 5 | 34 |
| Ex. 6 | 58 | Comp. Ex. 6 | 36 |
| Ex. 7 | 76 | Comp. Ex. 7 | 21 |

When Examples 2 to 4 are compared to Comparative Examples 2 to 4 in the same manner, even if any one of the cathode active materials of chemical formulas (17) to (19) is used, it is found that the same tendency as in the comparison between Example 1 and Comparative Example 1 is observed, with the result that a cycle property of a power storage device is improved by a nitroxyl polymer being into direct contact with a lithium anode. When Examples 5 and 6 are compared to Comparative Examples 5 and 6, it is found that the same tendency as in the comparison between Example 1 and Comparative Example 1 is observed, with the result that a cycle property of a power storage device is improved by a nitroxyl polymer being into direct contact with a lithium or anode. When Example 7 is compared to Comparative Example 7, even if carbon paper is used as a cathode collector, it is found that the same tendency as in the comparison between Example 1 and Comparative Example 1 is observed, with the result that a cycle property of a power storage device is improved by a nitroxyl polymer being into direct contact with a lithium anode.

INDUSTRIAL APPLICABILITY

Since a power storage device according to the present invention has excellent cycle property, it can be used as a power storage device requiring a long life. The present invention may be applied to back-up power sources for personal computers and servers, auxiliary power sources of electric cars, power sources for mobile device and the like, which have been conventionally employing electric double layer capacitors, Pb storage batteries, nickel hydrogen batteries, and lithium ion secondary batteries and the like.

The invention claimed is:

1. A secondary electrochemical cell comprising a cathode and an anode,
   wherein:
   the cathode comprises a cathode layer comprising nitroxyl polymer, and a cathode collector;
   the nitroxyl polymer has a nitroxyl cation partial structure represented by the following chemical formula (I) in oxidation state and has a nitroxyl radical partial structure represented by the following chemical formula (II)

in reduction state, employing a reaction for transferring an electron between the two states represented by the following equation (B) as an electrode reaction of the cathode:

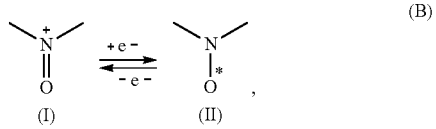

wherein the anode comprises a lithium or lithium alloy as an anode active material;

the cathode layer is impregnated with an electrolyte having an electrolyte solution comprising a solvent and an electrolyte salt dissolved in the solvent the cathode layer being in direct contact with a surface of the anode; and the nitroxyl polymer is applied onto the cathode collector and is in direct contact with the surface of the anode.

2. The secondary electrochemical cell according to claim 1, wherein a lithium-tin alloy or a lithium-silicon alloy is used as the anode active material.

3. The secondary electrochemical cell according to claim 1, wherein the cathode collector comprises an aluminum plate and a conductive auxiliary layer comprising carbon as a main component, and the conductive auxiliary layer formed and integrated on the aluminum plate.

4. The secondary electrochemical cell according to claim 1, wherein the cathode collector comprises a carbon paper.

5. The secondary electrochemical cell according to claim 1, wherein the nitroxyl polymer is a polymer compound having a cyclic nitroxyl structure represented by the following chemical formula (5) in oxidation state:

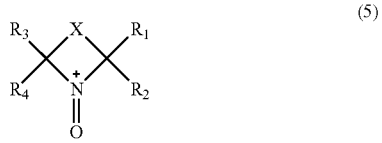

wherein each of $R_1$ to $R_4$ independently represents an alkyl group, and X represents a divalent group so that the chemical formula (5) forms a 5- to 7-membered ring, while X constitutes a part of a side chain or a main chain of the polymer.

6. The secondary electrochemical cell according to claim 5, wherein the nitroxyl polymer is a polymer compound having a side chain containing a residue which removes at least one hydrogen atom bonded to an element forming at least one cyclic nitroxyl structure selected from the group consisting of a 2,2,6,6-tetramethylpiperidinoxyl cation represented by chemical formula (6), a 2,2,5,5-tetramethylpyrrolidinoxyl cation represented by chemical formula (7) and a 2,2,5,5-tetramethylpyrrolinoxyl cation represented by chemical formula (8)'

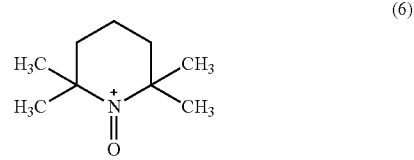

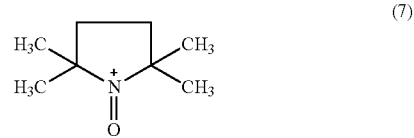

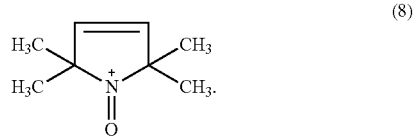

7. The secondary electrochemical cell according to claim 1, wherein the cathode layer further comprises an electroconductivity imparting material, and a content of the electroconductivity imparting material in the cathode layer is 50% by weight or less.

8. The secondary electrochemical cell according to claim 1, wherein the cathode layer consists essentially of the nitroxyl polymer.

9. The secondary electrochemical cell according to claim 1, wherein the cathode layer consists of the nitroxyl polymer and a polymer electrolyte.

10. The secondary electrochemical cell according to claim 1, wherein the secondary electrochemical cell is a coin-type cell.

11. The secondary electrochemical cell according to claim 1, wherein the solvent comprises a carbonate solvent.

12. The secondary electrochemical cell according to claim 1, wherein the cathode layer consists of the nitroxyl polymer, a polymer electrolyte and a binder.

* * * * *